(12) United States Patent
Thomas et al.

(10) Patent No.: US 8,468,810 B2
(45) Date of Patent: Jun. 25, 2013

(54) NOX ELIMINATION INJECTOR FIRING CONTROL CIRCUIT

(75) Inventors: Stephen Thomas, Laingsburg, MI (US); James Reynolds, East Lansing, MI (US); Sean Keidel, Jackson, MI (US); Michael Shovels, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 476 days.

(21) Appl. No.: 12/631,479

(22) Filed: Dec. 4, 2009

(65) Prior Publication Data

US 2011/0131960 A1 Jun. 9, 2011

(51) Int. Cl.
*F01N 3/00* (2006.01)

(52) U.S. Cl.
USPC .................................. 60/303; 60/286; 60/295

(58) Field of Classification Search
USPC .. 239/102, 4; 310/316.01, 317, 318; 123/478, 123/491, 494, 473, 476, 490; 363/15; 60/303, 60/286, 295, 285; 361/152, 153, 156
See application file for complete search history.

(56) References Cited

U.S. PATENT DOCUMENTS

| | | | | |
|---|---|---|---|---|
| 5,347,419 A * | 9/1994 | Caron et al. | | 361/154 |
| 5,992,401 A * | 11/1999 | Bylsma et al. | | 123/596 |
| 6,175,484 B1 * | 1/2001 | Caruthers et al. | | 361/159 |
| 2006/0150933 A1 | 7/2006 | Degner et al. | | |
| 2007/0138322 A1 | 6/2007 | Tarabulski et al. | | |
| 2008/0022654 A1 | 1/2008 | Broderick et al. | | |
| 2008/0192397 A1 * | 8/2008 | Liu | | 361/86 |
| 2009/0107469 A1 | 4/2009 | Takahashi et al. | | |
| 2010/0154750 A1 * | 6/2010 | Storch et al. | | 123/490 |

FOREIGN PATENT DOCUMENTS

WO WO2008009313 A * 1/2008

OTHER PUBLICATIONS

SAE International—The Engineering Society for Advancing Mobility Land Sea Air and Space, "Surface Vehicle Recommended Practice"; J1832, Rev. Feb. 2001, Warrendale, PA, U.S.A.
Notification of Transmittal of the international Search Report and the Written Opinion of the International Searching Authority, or the Declaration Dated Mar. 9, 2011.

* cited by examiner

*Primary Examiner* — Thomas Denion
*Assistant Examiner* — Patrick Maines
(74) *Attorney, Agent, or Firm* — Wood, Phillips, Katz, Clark & Mortimer

(57) ABSTRACT

An NOx injection system for treating a vehicle exhaust system comprises an injector for injecting a select material into the vehicle exhaust system and including an electrical coil. An impedance element is connected in series with a flyback diode across the coil. An injector firing control circuit is electrically connected to the injector for driving the coil, the switching circuit operating in an on mode to fire the injector and in an off mode to turn off the injector. The impedance element increases reverse voltage to increase injector turn off response.

21 Claims, 2 Drawing Sheets

NOX ELIMINATION INJECTOR FIRING CONTROL CIRCUIT

CROSS REFERENCE TO RELATED APPLICATIONS

There are no related applications.

FIELD OF THE INVENTION

This invention relates to systems and methods for eliminating oxides of nitrogen in a vehicle exhaust system and, particularly, to an injector firing control circuit providing rapid turn on and turn off of the injector.

BACKGROUND OF THE INVENTION

Vehicle exhaust gas after treatment systems are known to treat the exhaust from the combustion process such as from a compression engine. The system can include exhaust gas treatment components that clean and otherwise treat the exhaust gas. One such known system is a urea injection system for eliminating or reducing NOx (oxides of nitrogen) from the exhaust gas. The injection system injects urea into the exhaust. An injector includes an electrical solenoid having a coil fired by an injector control circuit. The injector is typically driven by a pulse width modulated control signal which may operate on the order of, for example, 5 Hz with relative on and off time controlled according to amount of urea injection required. Due to this nature of operation, it is advantageous that the turn on and turn off response time be as short as possible. Known injectors are sensitive to lift tolerances. While this can be overcome by simply increasing voltage, the increased voltage can increase heat input from the injector.

SUMMARY OF THE INVENTION

In accordance with the invention, there is provided an injector firing control circuit that improves turn off response.

There is disclosed in accordance with one aspect of the invention an NOx injection system for treating a vehicle exhaust system. The injection system comprises an injector for injecting a select material into the vehicle exhaust system and including an electrical coil. An injector firing control circuit is electrically connected to the injector for driving the coil and comprises a switch selectively coupling a supply to the electrical coil, a flyback diode connected across the electrical coil and an impedance element connected in series with the flyback diode to increase reverse voltage to increase injector turn off response It is a feature of the invention that the firing control circuit comprises a voltage source generating a first selective voltage level and a voltage storage circuit. A switching circuit operatively couples the voltage source and the voltage storage circuit to the electrical coil. The switching circuit operates in an on mode to fire the injector and in an off mode to turn off the injector. The voltage storage circuit is charged during the off mode and in the on mode both the voltage source and the voltage storage circuit are electrically connected to the injector whereby the electrical coil is initially driven by a second select voltage level higher than the first select voltage level and thereafter by the first select voltage level.

It is another feature of the invention that the impedance element comprises a Zener diode connected in series with the flyback diode, in an opposite polarity, to increase flyback voltage. Alternatively, the impedance element may comprise a resistor.

It is a further feature of the invention that the storage circuit comprises a capacitor charged by the voltage source during the off mode and the second select voltage level comprises the first select voltage level plus capacitor voltage level.

It is still another feature of the invention that the switching circuit comprises a plurality of switches electrically connecting the voltage source to the voltage storage circuit. The switches connect the voltage source and the voltage storage circuit in parallel in the off mode and connect the voltage source and the voltage storage circuit in series with the coil in the on mode.

It is yet another feature of the invention that the voltage storage circuit comprises a capacitor charged by a second voltage source generating the second select voltage level.

It is another feature of the invention that the capacitor is operatively connected to the first voltage source and the switching circuit selectively connects the capacitor to the second voltage source only during the off mode.

It is still another feature of the invention to provide a diode connected between the voltage source and the voltage storage circuit.

There is disclosed in accordance with another aspect of the invention an injector firing control circuit for a vehicle exhaust system injector for injecting a select material into a vehicle exhaust system for eliminating NOx. The control circuit comprises a voltage source generating a first select voltage level. A switch selectively couples the voltage source to the injector. A flyback diode is connected across the injector. An impedance element is connected in series with the flyback diode to increase reverse voltage to increase injector turn off response.

There is disclosed in accordance with a further aspect of the invention an NOx injection system for treating a vehicle exhaust system comprising an injector for injecting a select material into the vehicle exhaust system and including an electrical coil. An impedance element is connected in series with a flyback diode across the coil. An injector firing control circuit is electrically connected to the injector for driving the coil, the switching circuit operating in an on mode to fire the injector and in an off mode to turn off the injector. The impedance element increases reverse voltage to increase injector turn off response.

Further features and advantages of the invention will be readily apparent from the specification and from the drawings.

DETAILED DESCRIPTION OF THE INVENTION

Figure 1:
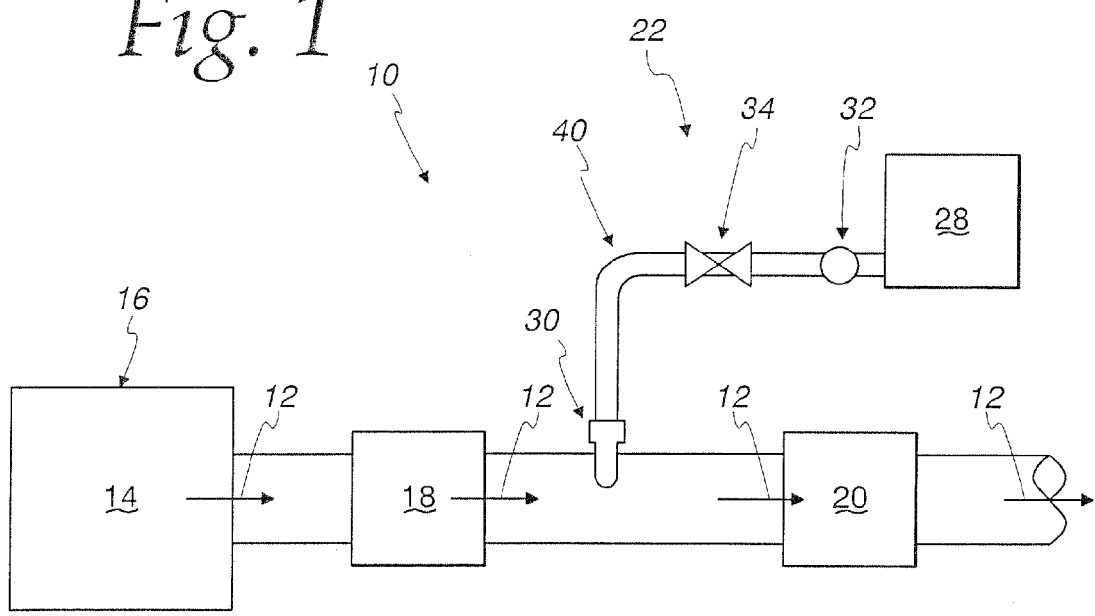
FIG. 1 is a diagrammatic view of an exhaust gas system controlled by an injector firing control circuit embodying the present invention.

With reference to FIG. 1, a diesel exhaust gas after treatment system 10 is provided to treat the exhaust 12 from a diesel combustion process 14, such as a diesel compression engine 16. The system 10 can include one or more exhaust gas treatment components 18 that clean and/or otherwise treat the exhaust gas 12, such as for example, a diesel particle filter (DPF), a burner, a diesel oxidation catalyst (DOC), a lean NOx trap, etc. There are many suitable types of constructions for such components, the selection of which will be highly dependent upon the parameters of each particular application.

The system 10 further includes a selective catalytic reduction catalyst (SCR) 20 and a urea injection system 22 for injecting urea 24 into the exhaust 12 upstream from the SCR 20. The urea injection system 22 will typically include a tank 28 or other type of container for the urea 24, one or more urea injectors 30, a pump 32 pressurizing the urea 24 in the system 22, a control valve 34 for controlling the flow of urea 24 in the system 22, and a flexible, electrically heated tube 40 for supplying the urea 24 from the tank 28 to the one or more injectors 30.

Figure 2:
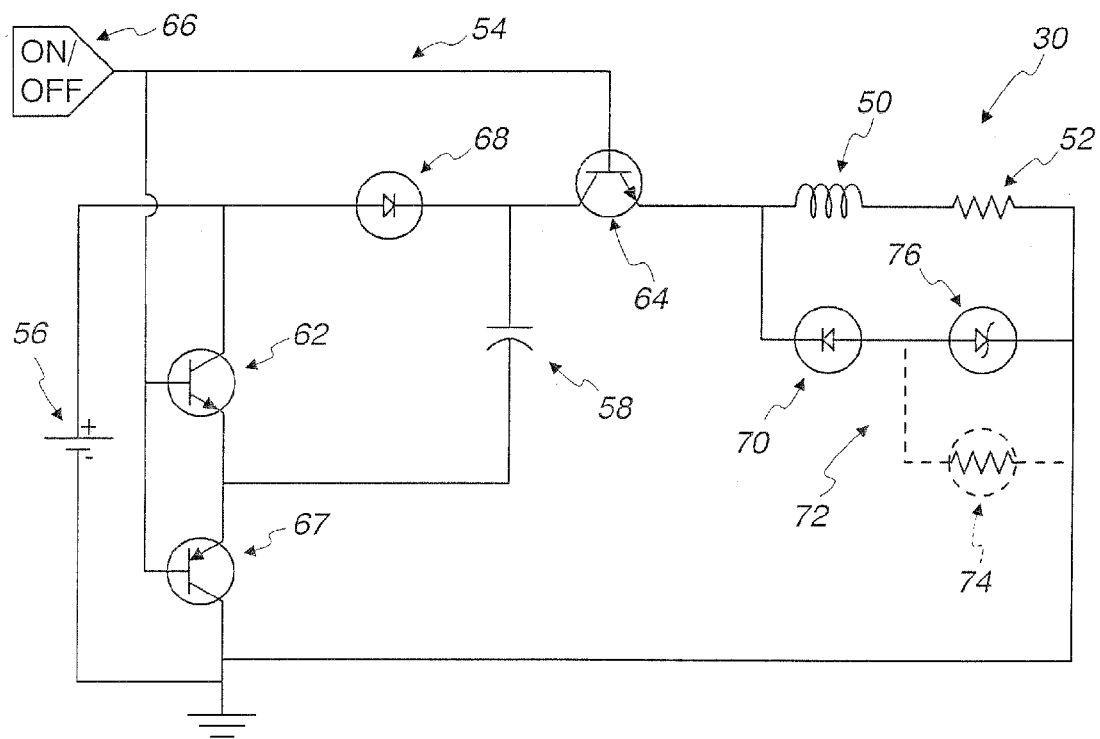
FIG. 2 is an electrical schematic of a first embodiment of an injector firing control circuit according to of the invention.

Referring to FIG. 2, the injector 30 includes an electrical solenoid coil 50 for opening and closing the injector, as is conventional. The electrical coil 50 includes resistance represented by a resistor 52 in series with the coil 50. An injector firing control circuit 54 in accordance with the invention controls firing of the injector 30. The control circuit 54 includes a voltage source 56. The voltage source 56 may be a vehicle battery or be generated by an electrical generator driven by the engine. The voltage source 56 generates a select voltage level that is selected according to a voltage required to hold the injector 30 in an open position, as described below. A capacitor 58 operates as a voltage storage circuit.

A switching circuit 60 operatively couples the voltage source 56 and the capacitor 58 to the injector 30. The switching circuit 60 includes a first NPN transistor 62, a second NPN transistor 64 and a PNP transistor 67, all controlled by an on/off signal from a block 66. The on/off signal is developed by a master control circuit for controlling overall operation of the injection system, as is known. The capacitor 58 is connected across the first NPN transistor 62, with a first diode 68 connected between the collector of the first NPN transistor 62 and the capacitor 58. The first NPN transistor 62 and the PNP transistor 67 are connected in series across the voltage source 56. The junction between the first diode 68 and the capacitor 58 is connected to the collector of the second NPN transistor 64, the emitter of which is connected to the high side of the injector 30. The low side of the injector 30 is connected to ground. A conventional flyback diode 70 is connected across the injector 30.

With the described firing control circuit 54 in an off mode, as controlled by the block 66, the NPN transistors 62 and 64 are not conducting so that the injector 30 is off. The PNP transistor 67 is conducting. Conversely, when the on/off signal is on, then the NPN transistors 62 and 64 are conducting and the PNP transistor 67 is not conducting. In the off mode, the capacitor 58 is effectively connected in parallel with the voltage source 56. Thus, the off mode comprises a charging mode. The capacitor 58 will charge to the voltage level of the voltage source 56. In the on mode, the capacitor 58 is electrically connected in series with the voltage source 56 and the injector 30. Thus, the injector 30 is driven by the combined voltage of the voltage source 56 and the capacitor 58 to provide a relatively high firing voltage comprising the select voltage level of the voltage source 56 plus the voltage level of the capacitor 58. As is known, the capacitor 58 will discharge. When the capacitor 58 is fully discharged the injector 30 is held open by the select voltage of the voltage source 56. The hold voltage is sufficient to hold the injector 30 in an on state, as described above.

The firing control circuit 54 uses a single drive voltage to develop a dual voltage firing circuit. This circuit makes the injector 30 less sensitive to lift tolerances and still maintains good rise time and off time response while minimizing heat generated by the injector 30.

As is known, the flyback diode 70 allows current in the injector 30 to unwind in the absence of any supply. This prevents a sharp voltage spike when the injector 30 is turned off. However, the injector typically has a low rate of decay for residual voltage causing the injector to remain open longer than may be desired. This may negatively impact injector linearity and operating range. In accordance with the invention an impedance element 72 is coupled in series with the flyback diode 70. This alters the flyback circuit to raise the reverse voltage. This can be done with a series resistor 74, or with a series Zener diode 76 connected with opposite polarity relative to the flyback diode 70. The Zener diode 76 would be preferred from an efficiency standpoint. The resistor option would replace the Zener diode 76 with a resistor, or a varistor.

The series combination of the flyback diode 70 and reverse biased Zener diode 76 provides a higher reverse voltage which causes the current in the injector 30 to go to zero more quickly to provide faster injector closing.

Figure 3:
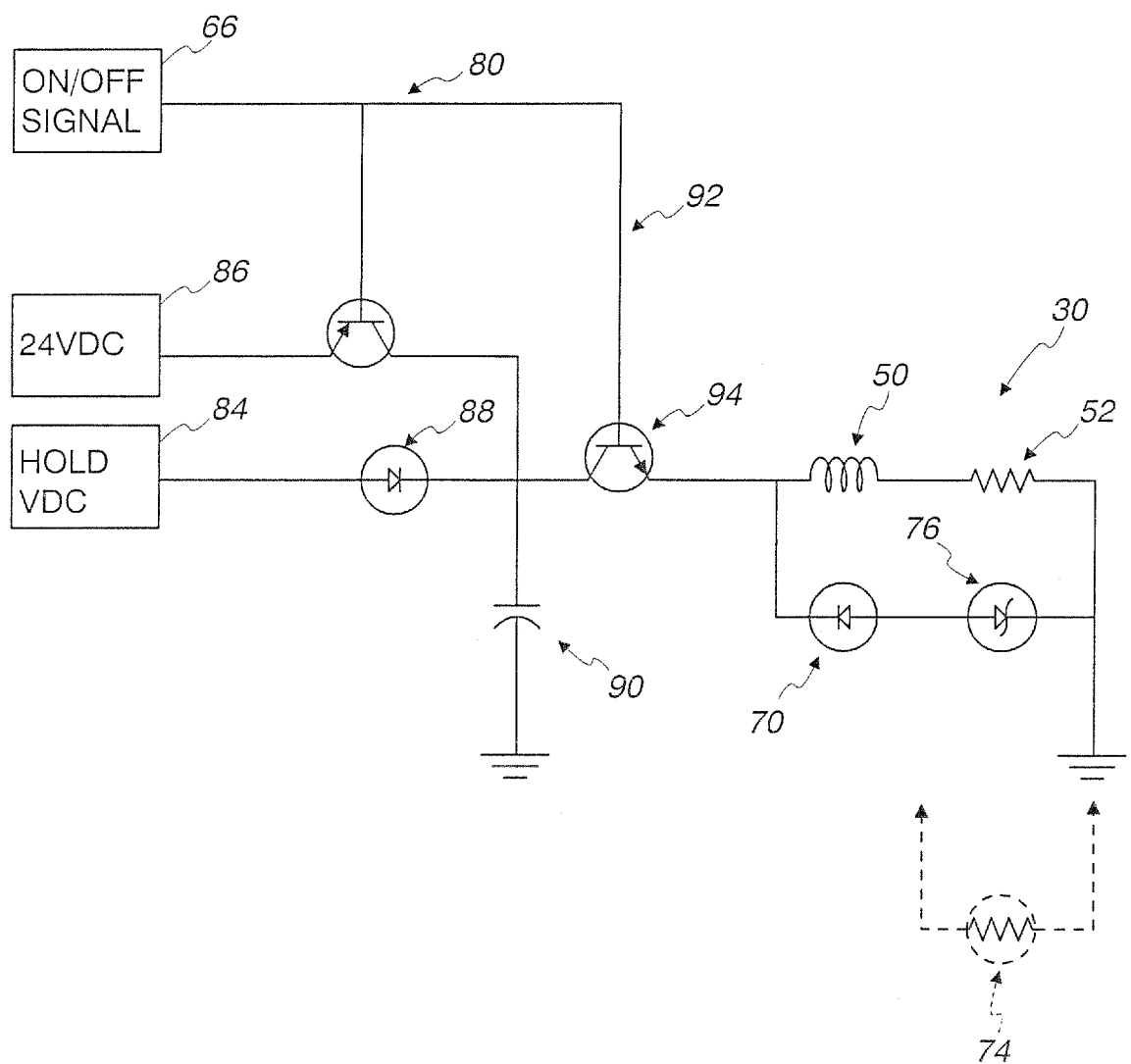
FIG. 3 is an electrical schematic of a second embodiment of an injector firing control circuit according to of the invention.

Referring to FIG. 3, an electrical schematic of an injector firing control circuit 80 in accordance with a second embodiment of the invention is illustrated. The on/off signal is generated at a block 66, as above. The firing control circuit 80 comprises a first voltage source 84 and a second voltage source 86. In the illustrated embodiment the second voltage source 86 comprises a 24 volt DC source. As is apparent, a different voltage level could be used, as necessary or desired. The first voltage source 84 develops a hold voltage which is less than 24 volts, yet sufficient to hold the injector 30 on. A diode 88 is connected between the first voltage source 84 and a node 98. A capacitor 90, defining a voltage storage circuit, is connected to the node 98. A switching circuit 92 comprises an NPN transistor 94 and a PNP transistor 96. The PNP transistor 96 connects the second voltage source 86 to the node 98. The NPN transistor 94 connects the node 98 to the injector 30. Both transistors 94 and 96 are operated by the on/off signal from the block 66, as above.

In an off mode, the PNP transistor 96 conducts so that the capacitor 90 charges to 24 volts as the second volt source 86 has a higher voltage than the first voltage source 84, as is apparent. In the on mode, the PNP transistor 96 stops conducting to disconnect the second voltage source 86 from the capacitor 90. Likewise, the NPN transistor 94 conducts to connect the node 98 to the injector 30. The injector 30 is thus turned on by the 24 volt level of the capacitor 90. The capacitor 90 begins discharging until it reaches the hold voltage of the first voltage source 84. As above, the injector 30 is initially operated by the higher voltage of the second voltage source 86 and then held by the lower voltage of the first voltage source 84. This ensures quick response on larger tolerance lifts and provides quicker response on opening while minimizing internal heat input and creates less magnetic field required to collapse. As with the first embodiment, a flyback diode 70 is connected across the injector 30.

In accordance with the invention, the Zener diode 76 or resistance element 74 is again connected in series with the flyback diode 70 to increase reverse voltage to decrease injector turn off time, as above.

Thus, in accordance with the invention, an injector firing control circuit increases the reverse voltage to decrease turn-off time.

The invention claimed is:
1. An NOx injection system for treating a vehicle exhaust system comprising:

an injector for injecting a select material into the vehicle exhaust system and including an electrical coil; and
an injector firing control circuit electrically connected to the injector for driving the coil comprising a switch selectively coupling a supply to the electrical coil, a flyback diode connected across the electrical coil and an impedance element connected in series with the flyback diode to increase reverse voltage to increase injector turn off response, wherein the injector firing control circuit comprises a voltage source generating a first select voltage level, a voltage storage circuit and a switching circuit, comprising the switch, operatively coupling the voltage source and the voltage storage circuit to the electrical coil, the switching circuit operating in an on mode to fire the injector and in an off mode to turn off the injector, the voltage storage circuit being charged during the off mode and in the on mode both the voltage source and the voltage storage circuit being electrically connected to the injector whereby the electrical coil is initially driven by a second select voltage level higher than the first select voltage level and thereafter by the first select voltage level.

2. The NOx injection system of claim 1 wherein the impedance element comprises a zener diode connected in series with the flyback diode, in an opposite polarity, to increase flyback voltage.

3. The NOx injection system of claim 1 wherein the impedance element comprises a resistor.

4. The NOx injection system of claim 1 wherein the switch comprises a transistor.

5. The NOx injection system of claim 1 wherein the voltage storage circuit comprises a capacitor charged by the voltage source during the off mode and the second select voltage level comprises the first select voltage level plus capacitor voltage level.

6. The NOx injection system of claim 1 wherein the switching circuit comprises a plurality of switches electrically connecting the voltage source to the voltage storage circuit, the switches connecting the voltage source and the voltage storage circuit in parallel in the off mode and connecting the voltage source and the voltage storage circuit in series with the coil in the on mode.

7. The NOx injection system of claim 1 wherein the voltage storage circuit comprises a capacitor charged by a second voltage source generating the second select voltage level.

8. The NOx injection system of claim 7 wherein the capacitor is operatively connected to the first voltage source and the switching circuit selectively connects the capacitor to the second voltage source only during the off mode.

9. The NOx injection system of claim 1 further comprising a diode connected between the voltage source and the voltage storage circuit.

10. An injector firing control circuit for a vehicle exhaust system injector for injecting a select material into a vehicle exhaust system for eliminating NOx, comprising:
a voltage source generating a first select voltage level;
a switch selectively coupling the voltage source to the injector;
a flyback diode connected across the injector;
an impedance element connected in series with the flyback diode to increase reverse voltage to increase injector turn off response;
a voltage storage circuit; and
a switching circuit, comprising the switch, operatively coupling the voltage source and the voltage storage circuit to the injector, the switching circuit operating in an on mode to fire the injector and an off mode to turn off the injector, the voltage storage circuit being charged during the off mode, and in the on mode both the voltage source and the voltage storage circuit being electrically connected to the injector whereby the injector is initially driven by a second select voltage level higher than the first select voltage level and thereafter by the first select voltage level.

11. The injector firing control circuit of claim 10 wherein the injector comprises an electrical coil and the flyback diode and impedance element are connected across the electrical coil.

12. The injector firing control circuit of claim 10 wherein the impedance element comprises a zener diode connected in series with the flyback diode, in an opposite polarity, to increase flyback voltage.

13. The injector firing control circuit of claim 10 wherein the impedance element comprises a resistor.

14. The injector firing control circuit of claim 10 wherein the voltage storage circuit comprises a capacitor charged by the voltage source during the off mode and the second select voltage level comprises the first select voltage level plus capacitor voltage level.

15. The injector firing control circuit of claim 10 wherein the switching circuit comprises a plurality of switches electrically connecting the voltage source to the voltage storage circuit, the switches connecting the voltage source and the voltage storage circuit in parallel in the off mode and connecting the voltage source and the voltage storage circuit in series with the injector in the on mode.

16. The injector firing control circuit of claim 10 wherein the voltage storage circuit comprises a capacitor charged by a second voltage source generating the second select voltage level.

17. The injector firing control circuit of claim 10 wherein the capacitor is operatively connected to the first voltage source and the switching circuit selectively connects the capacitor to the second voltage source only during the off mode.

18. The injector firing control circuit of claim 10 further comprising a diode connected between the voltage source and the voltage storage circuit.

19. An NOx injection system for treating a vehicle exhaust system comprising:
an injector for injecting a select material into the vehicle exhaust system and including an electrical coil;
an impedance element connected in series with a flyback diode across the coil; and
an injector firing control circuit electrically connected to the injector for driving the coil the impedance element increasing reverse voltage to increase injector turn off response, wherein the injector firing control circuit comprises a voltage source generating a first select voltage level, a voltage storage circuit and a switching circuit operatively coupling the voltage source and the voltage storage circuit to the electrical coil, the switching circuit operating in an on mode to fire the injector and in an off mode to turn off the injector, the voltage storage circuit being charged during the off mode and in the on mode both the voltage source and the voltage storage circuit being electrically connected to the injector whereby the electrical coil is initially driven by a second select voltage level higher than the first select voltage level and thereafter by the first select voltage level.

20. The NOx injection system of claim 19 wherein the impedance element comprises a zener diode connected in series with the flyback diode, in an opposite polarity, to increase flyback voltage.

21. The NOx injection system of claim 19 wherein the impedance element comprises a resistor.

\* \* \* \* \*

UNITED STATES PATENT AND TRADEMARK OFFICE
CERTIFICATE OF CORRECTION

| | | |
|---|---|---|
| PATENT NO. | : 8,468,810 B2 | Page 1 of 1 |
| APPLICATION NO. | : 12/631479 | |
| DATED | : June 25, 2013 | |
| INVENTOR(S) | : Stephen Thomas et al. | |

It is certified that error appears in the above-identified patent and that said Letters Patent is hereby corrected as shown below:

On the Title Page, Item (54) and in the Specification, Column 1, Lines 1-2 should read
NOx ELIMINATION INJECTOR FIRING CONTROL CIRCUIT In the Claims Column 6, line 49, Claim 19, after "coil" insert --,--

Signed and Sealed this
Twenty-sixth Day of May, 2015

Michelle K. Lee
*Director of the United States Patent and Trademark Office*